United States Patent [19]

Couch

[11] Patent Number: 4,475,210

[45] Date of Patent: Oct. 2, 1984

[54] DATA EYE MONITOR

[75] Inventor: Philip R. Couch, Roanoke, Va.

[73] Assignee: International Telephone and Telegraph Corporation, New York, N.Y.

[21] Appl. No.: 352,614

[22] Filed: Feb. 26, 1982

[51] Int. Cl.³ ........................................... H04L 13/22
[52] U.S. Cl. ..................................... 375/10; 328/147; 371/22; 375/76
[58] Field of Search ...................... 375/10, 13, 58, 76, 375/98; 329/104, 178, 179; 307/359; 371/4, 22, 5; 370/7, 13; 455/67; 340/146.2; 364/811; 328/146, 147, 149

[56] References Cited

U.S. PATENT DOCUMENTS 2,582,018  1/1952  El-Said ............................ 346/811 X
4,034,340  7/1977  Sant' Agostino ................. 375/10 X Primary Examiner—Benedict V. Safourek
Attorney, Agent, or Firm—John T. O'Halloran; Peter R. Ruzek

[57] ABSTRACT

The data eye monitor includes a pair of comparators which compare the data input signal with a fixed reference voltage and a variable reference voltage with the resultant output of these two comparators being clocked into a digital comparator providing negative pulses representing the difference between the outputs of the two comparators. The negative pulses are coupled to an integrator to which a positive current source is coupled with the integrator providing the variable reference voltage for one of the comparators and also the output voltage of the monitor since the variable reference voltage is proportional to the opening of the data eye.

24 Claims, 4 Drawing Figures

DATA EYE MONITOR

BACKGROUND OF THE INVENTION

The present invention relates to an arrangement to evaluate the received signal quality and more particularly to a data eye monitor for evaluating the signal quality of the received signal.

The term "data eye" is used in data signal evaluation to designate a pattern generated on an oscilloscope, which is triggered by the data clock and displays the received data waveform, when the data is not a simple repeating pattern. The resulting overlay of several traces on the oscilloscope produces a shape resembling a partially closed eye. The eye appears more closed when the data is distorted.

A data eye monitor is used in data transmission receivers and repeaters to monitor the size of the eye opening automatically providing a voltage proportional to eye opening which may be used for evaluation of the received signal. Uses include assistance in maual adjustment of receiver or repeater parameters, as part of an automatic receiver alignment system and as an evaluation of received signal quality.

No arrangement equivalent to the data eye monitor is known to exist. However, one of the functions of the data eye monitor is to predict error rate in a data receiver of a data transmission system. This is generally achieved by encoding the data for transmission in some way to include some known content which may be verified at the receiver, where errors in this content may be related to the number of data errors.

SUMMARY OF THE INVENTION

An object of the present invention is to provide an evaluation of received signal quality.

The data eye monitor of the present invention does not require errors to be made, but it will measure the system noise and distortion and from this the theoretical error rate or margin may be computed. The data eye monitor of the present invention does not require special coding.

A feature of the present invention is the provision of a data eye monitor for a data input signal comprising: first means to compare the input signal to a fixed reference voltage; second means to compare the input signal to a variable reference voltage; and third means coupled to the output of the first and second means to provide the variable reference voltage for the second means, the variable reference voltage being proportional to the opening of the data eye and contributing the output voltage of the monitor.

The data eye monitor may be used in set up of receiver timing and other parameters, such as, avalanche gain in an optical receiver and equalization in a receiver equipped with such controls. No known equivalent device exists in these cases and it is believed that in the past such set up required the use of error monitoring equipment and oscilloscopes and was a manual, time consuming operation.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

The data eye monitor of the present invention is intended for use in the above-mentioned applications where it measures the opening of the data eye as conventionally used for subjective monitoring of data transmission link performance. The opening is related to received signal quality and any improvement in reception conditions generally results in an enlarged eye opening. The device provides a d.c. voltage proportional to the eye opening which may therefore be used in most receiver set up operations where the eye voltage is simply maximized. The eye monitor of the present invention lends itself particularly to automatic set-up using closed loop control and where the control system maximizes data eye voltage.

Figure 1:
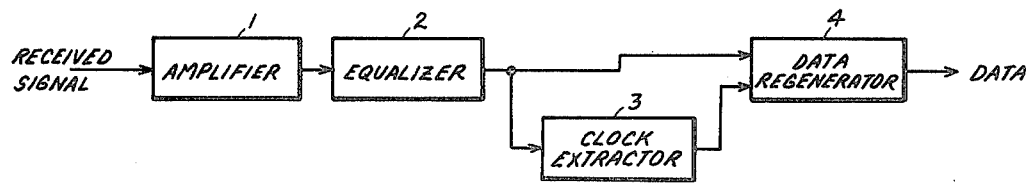
FIG. 1 is a block diagram of a prior art data receiver.

The data eye monitor is built as part of a data regenerator in a data receiver. As shown in FIG. 1 the data is generally received from a cable, optical fiber or some other transmission medium and amplified in amplifier 1 whose output is coupled to equalizer 2 with the output therefrom being split and coupled to a clock extractor 3 and a data regenerator 4 which in turn receives the output from clock extractor 3.

Figure 2:
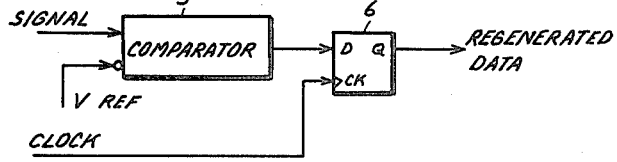
FIG. 2 is a block diagram of a known data regenerator.

The data regenerator 4 in cooperation with the output of clock extractor 3 reconstructs the data bits from the received waveform. A typical data regenerator for use as data regenerator 4 is shown in FIG. 2 where the received waveform is compared with a reference voltage $V_{REF}$ in comparator 5 and then is clocked out of comparator 5 by a D-type flip-flop 6 which receives a local clock bearing the proper phase relation to the data such as produced at the output of clock extractor 3 of FIG. 1.

Figure 3:
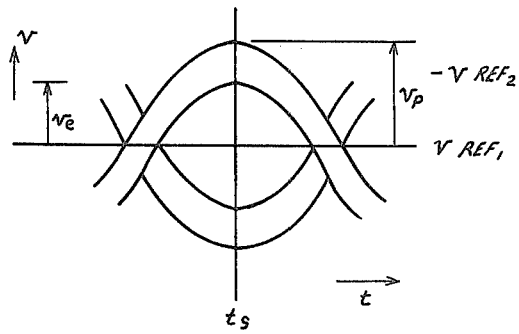
FIG. 3 is an illustration of a data eye.

FIG. 3 illustrates the data eye whose opening is to be maximized by the output of the data eye monitor in accordance with the principles of the present invention.

Figure 4:
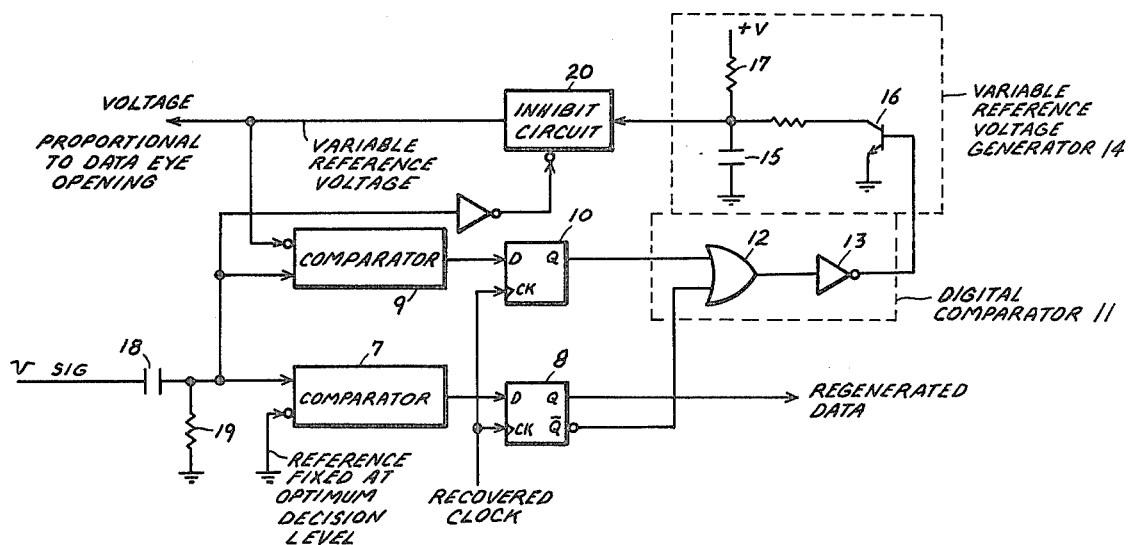
FIG. 4 is a block diagram partially in schematic form of the data eye monitor in accordance with the principles of the present invention.

FIG. 4 illustrates the data eye monitor in accordance with the principles of the present invention. The received signal is compared in comparator 7 having a fixed reference voltage applied thereto at an optimum decision level whose output is then clocked in the D-type flip-flop 8. This arrangement is similar to the arrangement of FIG. 2. The monitor of FIG. 4 has in addition thereto a second comparator 9 having a variable reference voltage coupled thereto to compare the received signal with this variable reference voltage. The output of comparator 9 is likewise clocked by D-type flip-flop 10 whose output is compared with the output of flip-flop 8 in a digital comparator 11 including, for example, an OR gate 12 and an inverter 13.

Differences in the outputs from flip-flops 8 and 10 are due to errors made by one comparator, but not by the other. It is always assumed that the second comparator, comparator 9, makes these errors since its reference is not set at the optimum decision level (the point where least errors are expected). These differences are converted to negative pulses in digital comparator 11 for couplings to a variable reference voltage generator 14 including an integrator 15 in the form of a capacitor. A positive current is also injected into capacitor 15 and the output of the capacitor is used as the variable reference voltage for comparator 9 and also as the voltage proportional to the data eye opening which is the output of the monitor of the present invention.

The circuit configuration is such that when no differences in the outputs of flip-flops 8 and 10 occur the positive current into integrator 15 causes the integrator output to increase with time which increases the difference between the two thresholds of comparators 7 and 9. When the difference in thresholds is very large differences in comparator decisions must occur. When differences in comparator outputs are detected in comparator 11 negative pulses are produced which are integrated in integrator 15 but causing the integrator output to fall. The greater the repetition rate of the pulses the faster the integrator will fall. Thus, a balance may be reached where the off-set on the reference voltage of comparator 9 is such that occasional differences in outputs occur and occasional negative pulses are fed into integrator 15 exactly cancelling the effect of the steady positive current and the integrator output is maintained. Any increase or decrease in the number of detected differences will cause a change in the integrator output until balance is restored. Thus, the integrator output voltage is the most positive voltage which may be used as a reference for the comparator 9 while making the same decisions most of the time (the frequency of differences being determined by the ratio of energy in a difference pulse to the steady charging current. Usually this is such that pulses are infrequent, i.e., they have much energy or the charging current is very low). This variable reference voltage at the output of the integrator 15 is a measure of the eye opening at the sample time (usually half way through the bit period) as determined by the clocking of flip-flops 8 and 9. The peak level of signal excursion (outside of the eye diagram) may be held constant by an automatic gain control circuit which is often included in the preceding circuit for other reasons. In the latter case the eye voltage is related to the quality of the received transmission.

Referring to FIG. 3, $v_p$ is equal to the peak signal excursion (positive), $v_e$ is equal to the eye opening (positive), $t_s$ is equal to the optimum sampling time, $v_{REF1}$ is equal to the optimum decision threshold and $v_{REF2}$ is equal to the offset decision threshold. To summarize, the circuitry of FIG. 4 provides the data eye monitor circuit where comparators 7 and 9 have their output signals sampled in time by the recovered clock in flip-flops 8 and 9 with these sampled decisions being compared in digital comparator 11. The output of comparator 11 are positive going difference pulses which causes transitor 16 to conduct producing negative going difference pulses which partially discharge capacitor 15, the integrator. The current through resistor 17 is the steady positive integrator current which causes the integrator output voltage to increase when no differences are detected. Capacitor 18 and resistor 19 coupled to the signal inputs of comparators 7 and 9 cause the input signal to swing symmetrically around ground potential which causes the optimum threshold or decision level to be ground or 0 volts. This arrangement simplifies the generation of the thresholds.

Another refinement is to inhibit the integrator output when no signal is received to avoid the conclusion that since no errors are detected the signal must be perfect which of course is not true when data is not present. This inhibit circuit is shown at 20 and operates to inhibit the output of the integrator 15 when there is no input signal present.

The circuit of FIG. 4 has been utilized to aid in manual alignment of clock phase, avalanche photo detector gain and equalizer parameters in a 300 Mb/s fiber optic receiver. A minimum level alarm can be added to the circuit of FIG. 4 to flag the conditions where the eye is small and errors are likely to occur which provides advance warning of impending failure.

The data eye monitor can be utilized in an automatic equalizer or in a receiver with complete automatic set-up where all parameters are adjusted automatically such that the data eye opening is maximized.

The circuit of FIG. 4 can also be utilized in secure communication where a prescribed amount of degradation is to be added to the data during transmission; the device being used to monitor the added degradation.

Other uses of the device are mostly extensions or adaptations of the above conditions.

While I have described above the principles of my invention in connection with specific apparatus it is to be clearly understood that this description is made only by way of example and not as a limitation to the scope of my invention as set forth in the objects thereof and in the accompanying claims.

I claim:

1. A data eye monitor for a data input signal comprising:
   first means for comparing said input signal to a fixed reference voltage;
   second means for comparing said input signal to a variable reference voltage that is always higher than the fixed reference voltage, said first and second comparing means issuing different output signal levels when the comparison results are the same, and the same output signal levels when the comparison results are different; and
   third means coupled to the output of said first and second means and operative for providing said variable reference voltage for said second means, said variable reference voltage being proportional to the opening of said data eye and constituting the output voltage of said monitor, said third means including an OR-gate having inputs coupled to the outputs of said first and second comparing means.

2. A monitor according to claim 1, wherein said first means includes
   a first comparator having an output, a first input receiving said input signal and a second input coupled to said fixed reference voltage, and
   a first D-type flip-flop coupled to said output of said first comparator and a clock input to clock a first output signal at said output of said first comparator into said third means.

3. A monitor according to claims 1 or 2, wherein said fixed reference voltage is equivalent to an optimum decision level.

4. A monitor according to claim 3, wherein said optimum decision level is where the least amount of errors in said input signal are expected.

5. A monitor according to claim 3, wherein said optimum decision level is ground.

6. A monitor according to claim 3, wherein said second means includes
   a second comparator having an output, a first input receiving said input signal and a second input coupled to said third means to receive said variable reference voltage, and a second D-type flip-flop having an inverting output and coupled to said output of said second comparator and said clock input, to clock a second output signal at said output of said second comparator through said inverting output into said third means.

7. A monitor according to claim 6, wherein said third means includes
a digital comparator coupled to said first and second D-type flip-flops to provide negative pulses representing differences between said first and second output signals, said digital comparator including said OR-gate as a component thereof, and
an integrator coupled to a positive current source and said digital comparator responsive to said positive current and said negative pulses to provide said variable reference voltage.

8. A monitor according to claim 7, further including fourth means coupled between said integrator and said second comparator responsive to said input signal to inhibit said variable reference voltage when said input signal is not present.

9. A monitor according to claim 8, wherein said digital comparator further includes
an inverter coupled to the output of said OR gate.

10. A monitor according to claim 7, wherein said digital comparator further includes
an inverter coupled to the output of said OR gate.

11. A monitor according to claim 2, wherein said second means includes
a second comparator having an output, a first input receiving said input signal and a second input coupled to said third means to receive said variable reference voltage, and
a second D-type flip-flop having an inverting output and coupled to said output of said second comparator and said clock input, to clock a second output signal at said output of said second comparator through said inverting output into said third means.

12. A monitor according to claim 11, wherein said third means includes
a digital comparator coupled to said first and second D-type flip-flops to provide negative pulses representing differences between said first and second output signals, said digital comparator including said OR-gate as a component thereof, and
an integrator coupled to a positive current source and said digital comparator responsive to said positive current and said negative pulses to provide said variable reference voltage.

13. A monitor according to claim 12 further including fourth means coupled between said integrator and said second comparator responsive to said input signal to inhibit said variable reference voltage when said input signal is not present.

14. A monitor according to claim 13, wherein said digital comparator further includes
an inverter coupled to the output of said OR gate.

15. A monitor according to claim 12, wherein said digital comparator further includes
an inverter coupled to the output of said OR gate.

16. A monitor according to claim 1, wherein said second means includes
a comparator having an output, a first input receiving said input signal and a second input coupled to said third means to receive said variable reference voltage, and
a D-type flip-flop having an inverting output and coupled to said output of said comparator and a clock input, to clock an output signal at said output of said comparator through said inverting output into said third means.

17. A monitor according to claim 16, wherein said third means includes
a digital comparator coupled to said first means and said D-type flip-flop to provide negative pulses representing differences between the output signals of said first means and said D-type flip-flop, said digital comparator including said OR-gate as a component thereof, and
an integrator coupled to a positive current source and the output of said digital comparator responsive to said positive current and said negative pulses to provide said variable reference voltage.

18. A monitor according to claim 17, further including
fourth means coupled between said integrator and said comparator responsive to said input signal to inhibit said variable reference voltage when said input signal is not present.

19. A monitor according to claim 18, wherein said digital comparator further includes
to the output of said OR gate.

20. A monitor according to claim 17, wherein said digital comparator further includes
to the output of said OR gate.

21. A monitor according to claim 2, wherein said third means includes
a digital comparator coupled to said first flip-flop and said second means to provide negative pulses representing differences between said first output signal and the output signal of said second means, said digital comparator including said OR-gate as a component thereof, and
an integrator coupled to a positive current source and the output of said digital comparator responsive to said positive current and said negative pulses to provide said variable reference voltage.

22. A monitor according to claim 21, further including
fourth means coupled between said integrator and said comparator responsive to said input signal to inhibit said variable reference voltage when said input signal is not present.

23. A monitor according to claim 22, wherein said digital comparator further includes
an inverter coupled to the output of said OR gate.

24. A monitor according to claim 21, wherein said digital comparator further includes
an inverter coupled to the output of said OR gate.

* * * * *